Figure 1:
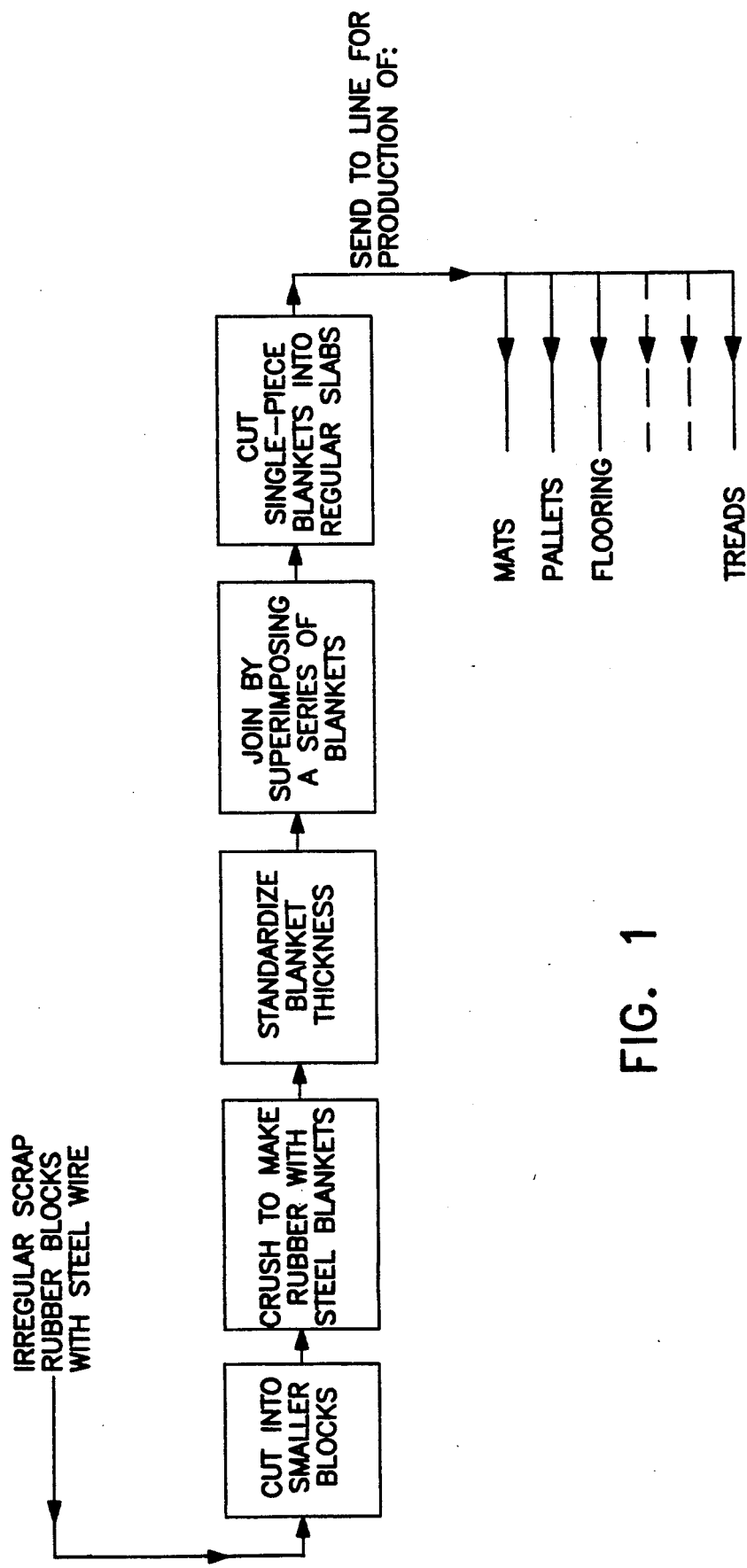

United States Patent [19]
Colognori

[11] Patent Number: 5,199,148
[45] Date of Patent: Apr. 6, 1993

[54] METHOD OF PROCESSING RUBBER BLOCKS WITH STEEL

[76] Inventor: Umberto Colognori, Av. Parana, No. 2128, Sorocaba, S. Paulo, Brazil

[21] Appl. No.: 800,245

[22] Filed: Nov. 29, 1991

[30] Foreign Application Priority Data

Feb. 25, 1991 [BR] Brazil ............................. PI9100739

[51] Int. Cl.⁵ ........................ B07B 13/00; B23P 17/04
[52] U.S. Cl. ............................ 29/403.1; 241/DIG. 31
[58] Field of Search .............. 29/403.1; 241/DIG. 31, 241/DIG. 38

[56] References Cited

U.S. PATENT DOCUMENTS

| | | | |
|---|---|---|---|
| 4,405,090 | 9/1983 | Wakeem | 241/DIG. 31 X |
| 4,474,334 | 10/1984 | Tatai et al. | 241/DIG. 31 X |
| 4,802,635 | 2/1989 | Barclay | 241/DIG. 31 X |
| 4,840,316 | 6/1989 | Barclay | 241/DIG. 31 X |
| 5,086,552 | 2/1992 | Moore | 29/403.1 |

*Primary Examiner*—Timothy V. Eley
*Attorney, Agent, or Firm*—Steinberg & Raskin

[57] ABSTRACT

This invention relates to a method of processing rubber blocks with steel. The rubber blocks of irregular shape come from scrap material provided by tire production lines. The irregular blocks of rubber with wire and capillary strands of steel are cut into smaller blocks and then these smaller blocks are crushed until they turn into blankets of rubber and steel wire. The thickness of each of the rubber and steel wire blankets is made uniform. A plurality of rubber and steel wire blankets of uniform thickness are then joined together to make a single piece of rubber and steel wire having a uniform thickness. The single piece is then cut so as to form processed slabs ready to be used as raw material for other processing lines where rubber articles are manufactured.

1 Claim, 1 Drawing Sheet

METHOD OF PROCESSING RUBBER BLOCKS WITH STEEL

The present specification relates to a method of processing rubber blocks with steel and, more specifically, to a method of processing rubber blocks with steel obtained from the scrap of tire manufacturing companies.

As is known to those skilled in the art, the volume of scrapped material in the manufacturing companies is very high.

Although these indefinitely shaped rubber blocks with steel wires come from burrs and shavings left over in the tire production line, they are of no use to the manufacturers, and their worthlessness may be regarded as a waste of material that makes the process more expensive, with the costs of this loss being incorporated in the cost of the finished product or, in other words, in the tire, thereby making the latter more expensive.

One object of the present invention is to provide a method of processing rubber blocks with steel whereby a lower cost is achieved, making it feasible for this scrap to be reused to obtain raw material for other by-products.

Another object of the present invention is to provide a method of processing rubber blocks with steel whereby a reduction in the final costs of tire production will be achieved.

A further object of the present invention is to provide a method of processing rubber blocks with steel whereby low-cost raw material can be obtained for the production of a number of rubber products and, consequently, enable a cutback in the cost of such by-products as pallets, mats, floorings, treads, and the like.

These and other objects and advantages of the present invention are achieved by a method of processing rubber blocks with steel coming, in any irregular shape whatsoever, from scrap material left over by the tire production line, comprising the steps of: cutting the irregular blocks from the tire production line into smaller blocks; crushing these smaller blocks of rubber and steel wire until they turn into blankets; standardizing the thickness of these rubber-and-steel blankets; joining them together by superimposing a plurality of rubber blankets and steel wires of a standardized thickness to make up a single piece of homogeneous thickness; and cutting the single, homogeneously thick rubber and steel wire piece so as to form processed slabs, ready to be used as raw material for other lines on which rubber articles are manufactured.

The present invention will now be described with reference to the attached drawing, wherein the sole FIGURE represents a simplified block diagram of the processing steps that comprise the present object of the invention patent.

In accordance with FIG. 1, the method of processing rubber blocks with steel coming from scrap material originated and collected in irregular shapes at the tire production line comprises the steps of: cutting the irregular block of rubber with wire and capillary strands of steel into blocks of smaller sizes; crushing, by the use of presses or the like, the cut rubber block with steel, until it turns into a blanket; regulating the thickness of these rubber-and-steel-wire blankets such that the blankets will have a uniform thickness; joining the blankets together by superimposing and pressing a plurality of rubber blankets and steel together by compression until a single piece of rubber and steel of uniform thickness is obtained; and cutting this single piece into slabs of given dimensions, depending on the by-product manufacturing line for which they are intended. The blankets, having the same thickness, can be joined together by any method known in the art, preferably by compression. In this manner, the thickness at the borders of the blankets will be uniform in conformity with the rest of the blankets. Thus, a single piece of rubber and steel having a uniform thickness will be formed from the plurality of rubber and steel wire blankets.

The product from this processing method can be used as raw material for the production of pallets, mats, flooring, treads and other manufactured rubber articles.

Although no more than the basic processing steps have been described, it should be emphasized that improvements may be introduced without departing from the scope of the present invention.

What is claimed is:

1. A method for processing rubber blocks with steel wire of irregular shapes and coming from scrap material provided by tire production lines, comprising the steps of:

cutting irregular blocks of rubber and steel wire from the tire production line into smaller blocks of rubber and steel wire;

crushing said smaller blocks of rubber and steel wire such that blankets of rubber and steel wire are formed;

regulating the thickness of said blankets such that said blankets have a uniform thickness;

joining said blankets together by superimposing a plurality of said blankets having a uniform thickness to thus make up a single piece of rubber and steel wire having a uniform thickness; and cutting said single piece of rubber and steel wire so as to form processed slabs, ready to be used as raw material for other processing lines where rubber articles are manufactured.

* * * * *